US012492104B2

(12) United States Patent
Nishimoto

(10) Patent No.: US 12,492,104 B2
(45) Date of Patent: Dec. 9, 2025

(54) ESTIMATION APPARATUS AND CRANE

(71) Applicant: TADANO LTD., Kagawa (JP)

(72) Inventor: Shoji Nishimoto, Kagawa (JP)

(73) Assignee: TADANO LTD., Kagawa (JP)

( * ) Notice: Subject to any disclaimer, the term of this patent is extended or adjusted under 35 U.S.C. 154(b) by 179 days.

(21) Appl. No.: 18/271,574

(22) PCT Filed: Mar. 29, 2022

(86) PCT No.: PCT/JP2022/015651
§ 371 (c)(1),
(2) Date: Jul. 10, 2023

(87) PCT Pub. No.: WO2022/224758
PCT Pub. Date: Oct. 27, 2022

(65) Prior Publication Data
US 2023/0406678 A1 Dec. 21, 2023

(30) Foreign Application Priority Data
Apr. 20, 2021 (JP) ................................ 2021-070805

(51) Int. Cl.
*B66D 1/30* (2006.01)
*B66D 1/40* (2006.01)
(Continued)

(52) U.S. Cl.
CPC ................. *B66D 1/30* (2013.01); *B66D 1/40* (2013.01); *B66D 1/50* (2013.01); *B66D 1/54* (2013.01); *B66D 1/56* (2013.01)

(58) Field of Classification Search
CPC ... B66D 1/30; B66D 1/40; B66D 1/48; B66D 1/485; B66D 1/50; B66D 1/505;
(Continued)

(56) References Cited

U.S. PATENT DOCUMENTS 4,448,396 A * 5/1984 Delago .................. B66C 13/02 414/139.6
4,475,163 A * 10/1984 Chandler ................ B63B 21/00 377/17
(Continued)

FOREIGN PATENT DOCUMENTS

JP H1017277 A * 1/1998 ............. B66C 23/88
JP 3280238 B2 * 4/2002 ............... B66D 1/54
(Continued)

OTHER PUBLICATIONS

JP2021031255A Translation; Ichikawa Hiroki; Mobile Crane; Published on: Mar. 1, 2021; Published by: Espacenet (Year: 2021).*
(Continued)

*Primary Examiner* — Anna M Momper
*Assistant Examiner* — Raveen J Dias
(74) *Attorney, Agent, or Firm* — Paratus Law Group, PLLC

(57) ABSTRACT

Provided is an estimation apparatus for estimating a number of wound layers of a wire rope in a crane including a boom, a winch drum, and the wire rope wound around the winch drum, the estimation apparatus being mounted on the crane, the estimation apparatus including: a calculation unit that calculates a delivery length of the wire rope; a detection unit that detects a rotational amount of the winch drum; and a control unit that estimates the number of wound layers, based on a difference in the delivery length of the wire rope and a difference in the rotational amount of the winch drum between a first orientation and a second orientation of the boom.

5 Claims, 6 Drawing Sheets

(51) Int. Cl.

*B66D 1/50* (2006.01)
*B66D 1/54* (2006.01)
*B66D 1/56* (2006.01)

(58) Field of Classification Search

CPC . B66D 1/52; B66D 1/525; B66D 1/54; B66D 1/56; B66D 1/58; B66C 13/00; B66C 13/18; B66C 13/46; B66C 13/48; B66C 15/00; B66C 15/02; B66C 15/06; B66C 15/065; B66C 23/00; B66C 23/60; B66C 23/70; B66C 23/701; B66C 23/702; B66C 23/88; B66C 23/90; B66C 23/905

See application file for complete search history.

(56) References Cited

U.S. PATENT DOCUMENTS

| | | | | |
|---|---|---|---|---|
| 9,206,019 | B2 * | 12/2015 | Miyoshi | B66C 23/88 |
| 10,836,612 | B1 * | 11/2020 | Masuda | B66D 1/44 |
| 11,702,325 | B2 * | 7/2023 | Kanda | B66C 13/46 212/276 |
| 12,180,043 | B2 * | 12/2024 | Noguchi | B66C 23/905 |
| 12,195,309 | B2 * | 1/2025 | Tanii | B66C 23/905 |
| 2005/0216116 | A1 * | 9/2005 | Nield | B66D 1/40 700/213 |
| 2007/0290182 | A1 * | 12/2007 | Noeske | B66D 1/54 254/327 |
| 2018/0057319 | A1 * | 3/2018 | Hirate | B66C 13/00 |
| 2019/0119080 | A1 * | 4/2019 | Fukumori | B66C 15/065 |
| 2019/0270624 | A1 * | 9/2019 | Sembo | B66C 13/22 |
| 2019/0352148 | A1 * | 11/2019 | Fanello | B66C 23/44 |
| 2020/0031633 | A1 * | 1/2020 | Kanda | B66C 13/22 |
| 2020/0207590 | A1 * | 7/2020 | Mitani | B66C 13/23 |
| 2020/0247647 | A1 * | 8/2020 | Kanda | B66C 13/46 |
| 2021/0221655 | A1 * | 7/2021 | Hayashi | B66C 13/18 |
| 2021/0371255 | A1 * | 12/2021 | Kanda | B66C 23/42 |
| 2022/0009753 | A1 * | 1/2022 | Noguchi | B66C 23/905 |
| 2022/0063965 | A1 * | 3/2022 | Minami | B66C 13/46 |
| 2022/0219953 | A1 * | 7/2022 | Tanii | B66C 13/46 |
| 2023/0101055 | A1 * | 3/2023 | Caldwell | B66D 1/485 254/276 |
| 2023/0227290 | A1 * | 7/2023 | Minami | B66C 13/066 212/273 |
| 2023/0264927 | A1 * | 8/2023 | Minami | B66C 13/066 212/273 |
| 2024/0124272 | A1 * | 4/2024 | Maedo | B66D 1/54 |

FOREIGN PATENT DOCUMENTS

| | | | | |
|---|---|---|---|---|
| JP | 2020033114 A * | 3/2020 | | B66D 1/30 |
| JP | 2021-031255 A | 3/2021 | | |
| WO | WO-2019069991 A1 * | 4/2019 | | B66C 23/585 |
| WO | WO-2020085314 A1 * | 4/2020 | | B66D 3/043 |

OTHER PUBLICATIONS

Mar. 24, 2025, European Search Report issued for related EP Application No. 22791533.7.

Jun. 21, 2022, International Search Report issued for related PCT Application No. PCT/JP2022/015651.

Jun. 21, 2022, International Search Opinion issued for related PCT Application No. PCT/JP2022/015651.

* cited by examiner

ESTIMATION APPARATUS AND CRANE

CROSS REFERENCE TO PRIOR APPLICATION

This application is a National Stage Patent Application of PCT International Patent Application No. PCT/JP2022/015651 (filed on Mar. 29, 2022) under 35 U.S.C. § 371, which claims priority to Japanese Patent Application No. 2021-070805 (filed on Apr. 20, 2021), which are all hereby incorporated by reference in their entirety.

TECHNICAL FIELD

The present invention relates to an estimation apparatus for estimating the number of wound layers of a wire rope wound around a winch drum and a crane including the estimation apparatus.

BACKGROUND ART

There is a conventionally known apparatus that applies, to control in a mobile crane, the difference in the length of winding of a wire rope to the rotation of a winch drum, due to a change in the number of wound layers of the wire rope wound around the winch drum.

As such an apparatus, for example, Patent Literature 1 discloses a rope irregular-winding prevention apparatus that acquires accurately the position of winding of a rope in the axial direction of rotation of a winch barrel and moves a guide sheave to prevent occurrence of irregular winding of the rope.

CITATION LIST

Patent Literature

Patent Literature 1: JP 2020-33114 A

SUMMARY OF THE INVENTION

Problems to be Solved by the Invention

According to the invention disclosed in Patent Literature 1, with a known length of rope, the length of the rope delivered from a winch drum in accordance with the orientation of a working machine (hereinafter, referred to as "delivery rope length") is found. Then, according to the invention disclosed in Patent Literature 1, based on the delivery rope length, the number of wound layers of the robe wound around the winch drum is estimated.

However, according to the invention disclosed in Patent Literature 1, if the rope is shortened by cutting or an unprescribed length of rope is used, the number of wound layers is likely to be estimated incorrectly.

Thus, an object of the present invention is to provide an estimation apparatus capable of estimating accurately the number of wound layers of a rope wound around a winch drum.

Solutions to Problems

According to an aspect of the present invention, provided is an estimation apparatus for estimating a number of wound layers of a wire rope in a crane including a boom, a winch drum, and the wire rope wound around the winch drum, the estimation apparatus being mounted on the crane, the estimation apparatus including:

a calculation unit that calculates a delivery length of the wire rope;

a detection unit that detects a rotational amount of the winch drum; and a control unit that estimates the number of wound layers, based on a difference in the delivery length of the wire rope and a difference is the rotational amount of the winch drum between a first orientation and a second orientation of the boom.

According to an aspect of the present invention, provided is a crane including the estimation apparatus described above.

Effects of the Invention

According to the present invention, provided can be an estimation apparatus capable of estimating accurately the number of wound layers of a rope wound around a winch drum.

DESCRIPTION OF EMBODIMENTS

An embodiment of the present invention will be described below with reference to the drawings. Note that the constituent elements in the following embodiment are exemplary and thus the technical scope of the present invention is not limited to the constituent elements. A rough terrain crane 1 will be exemplarily given in the following embodiment, but this is not limiting. Thus, the present invention can be widely applied to any other mobile cranes.

(Entire Configuration of Crane)

Figure 1:
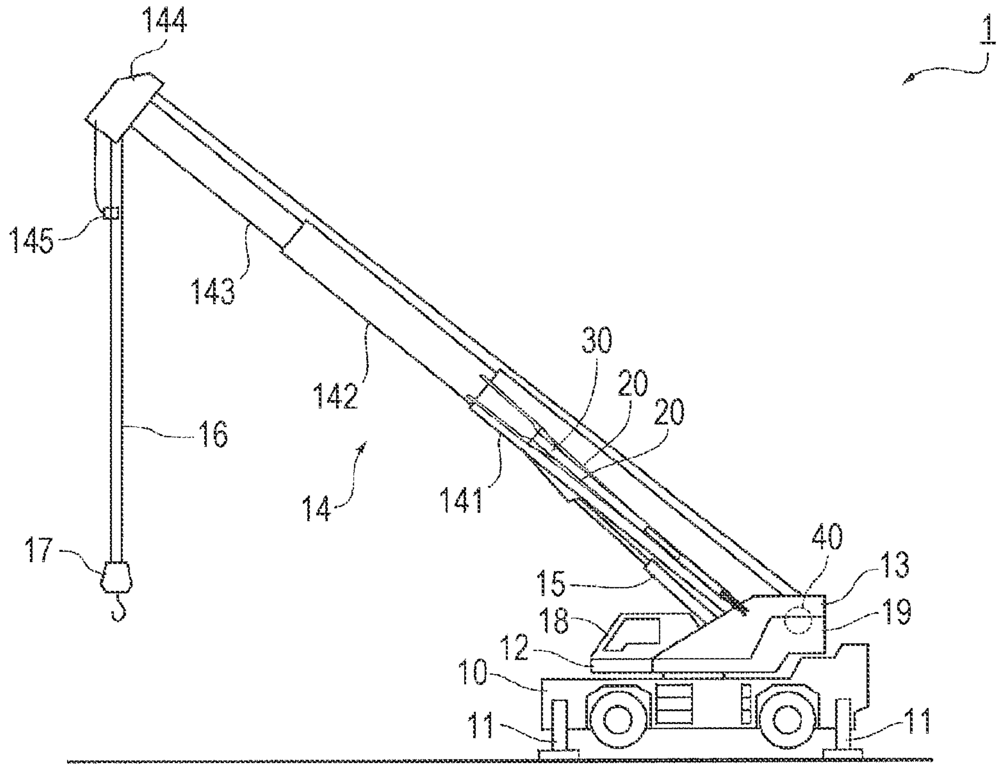
FIG. 1 is a side view of a rough terrain crane according to an embodiment of the present invention.

As illustrated in FIG. 1, a rough terrain crane 1 according to the present embodiment includes a vehicle body 10 as the main body of a vehicle having a traveling function, outriggers 11 provided one-to-one at the four corners of the vehicle body 10, a swivel 12 attached to the vehicle body 10 so as to swivel horizontally, and a boom 14 attached to a bracket 13 (upper portion of a swivel frame) provided vertically on the swivel 12.

The outriggers 11 are each capable of slide-protrusion/side-retraction outside in the width direction of the vehicle body 10, due to extension/contraction of a slide cylinder. In addition, the outriggers 11 are each capable of jack-protrusion/jack-retraction in the up-down direction of the vehicle body 10, due to extension/contraction of a jack cylinder.

The swivel 12 includes a pinion gear for transmission of the power of a swivel motor. The pinion gear engages with a circular gear provided in the vehicle body 10 and moves rotationally around the axis of swiveling. The swivel 12 includes a cab 18 disposed on the right in its front, the bracket 13 disposed at the center in its rear, and a counter weight 19 disposed at a lower portion in its rear.

The boom 14 includes a base boom 141, one or a plurality of intermediate booms 142, and a front boom 143 in telescopic combination. The boom 14 extends/contracts due to an extension cylinder disposed its inside.

The outermost base boom 141 has a base portion attached pivotably to a support shaft horizontally provided at the bracket 13. The base boom 141 moves upward or downward around the support shaft. Furthermore, a derricking cylinder 15 is provided ranging from the bracket 13 to the lower face of the base boom 141. The entire boom 14 rises/falls due co extension/contraction of the derricking cylinder 15. A boom-length detector 511 and a boom derricking-angle detector 512 measure the boom length LB and derricking angle θB of the boom 14, respectively. The measured boom length LB and derricking angle θB are transmitted to a controller 60 as a control unit.

A sheave is disposed at a boom head 144 that the front boom 143 has at its front end. A wire rope 16 passes over the sheave. The wire rope 16 has a front end from which a hook block 17 is hung. Meanwhile, the wire rope 16 has a base end wound around a winch 40. Thus, the wire rope 16 and the hook block 17 can be reeled in or out due to rotation of the winch 40.

In order to prevent the hook block 17 from striking against/being caught in the boom head 144, an over-hoisting detection switch 145 is attached to the boom head 144. The over-hoisting detection switch 145 is hung at a predetermined distance from the boom head 144. Then, an over-hoisting position detector 52 monitors the over-hoisting detection switch 145. The over-hoisting position detector 52 transmits, to the controller 60, the ON/OFF state of the over-hoisting detection switch 145.

Furthermore, a jib 30 and tension rods 20 and 20 can be attached to the boom head 144. Note that, referring to FIG. 1, the jib 30 having been held laterally is stored. The jib 30 can be detachably attached so as to extend from the boom head 144 (an increase is made in working radius).

The jib 30 is foldable with respect to the boom 14 due to extension/contraction of a tilt cylinder (not illustrated) and is extendable/contractable due to an extension cylinder (not illustrated). The tension rods 20 and 20 are each provided ranging from the boom head 144 to the intermediate position of the jib 30 and pull the jib 30 upward. The jib length LJ and jib tilt angle OJ of the jib 30 are measured by a jib-length detector 513 and a jib tilt-angle detector 514, respectively, and then are transmitted to the controller 60.

Figure 2:
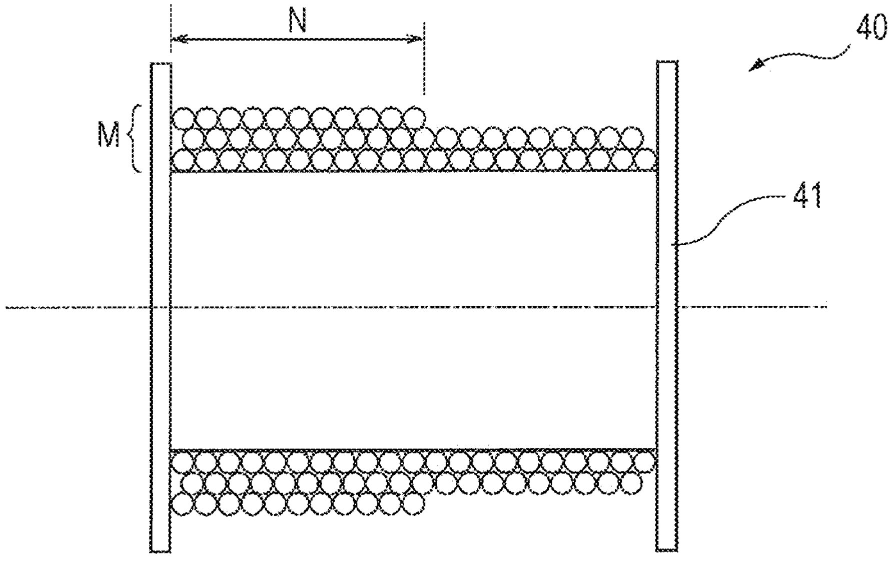
FIG. 2 is an explanatory view for the number of wound layers (layer position) and the delivery position on a winch drum.

As illustrated in FIG. 2, the winch 40 includes a winch drum 41 (winch barrel) cylindrical in shape, and a hydraulic motor and reduction gear (not illustrated) that serve as a drive unit that rotates the winch drum 41. The wire rope 16 is wound around the winch drum 41. That is, the wire rope 16 is wound systematically in layers around the winch drum 41. Then, the number of layers of the wire rope 16 is defined as M (M is a natural number) and the position in the lateral direction of the wire rope 16 (the ratio or the distance from the flange portion on the winching start side to the current position in each layer to the drum full width that is defined as 1) is defined as the rope delivery position N (N is a decimal).

(Configuration of Control System)

Figure 3:
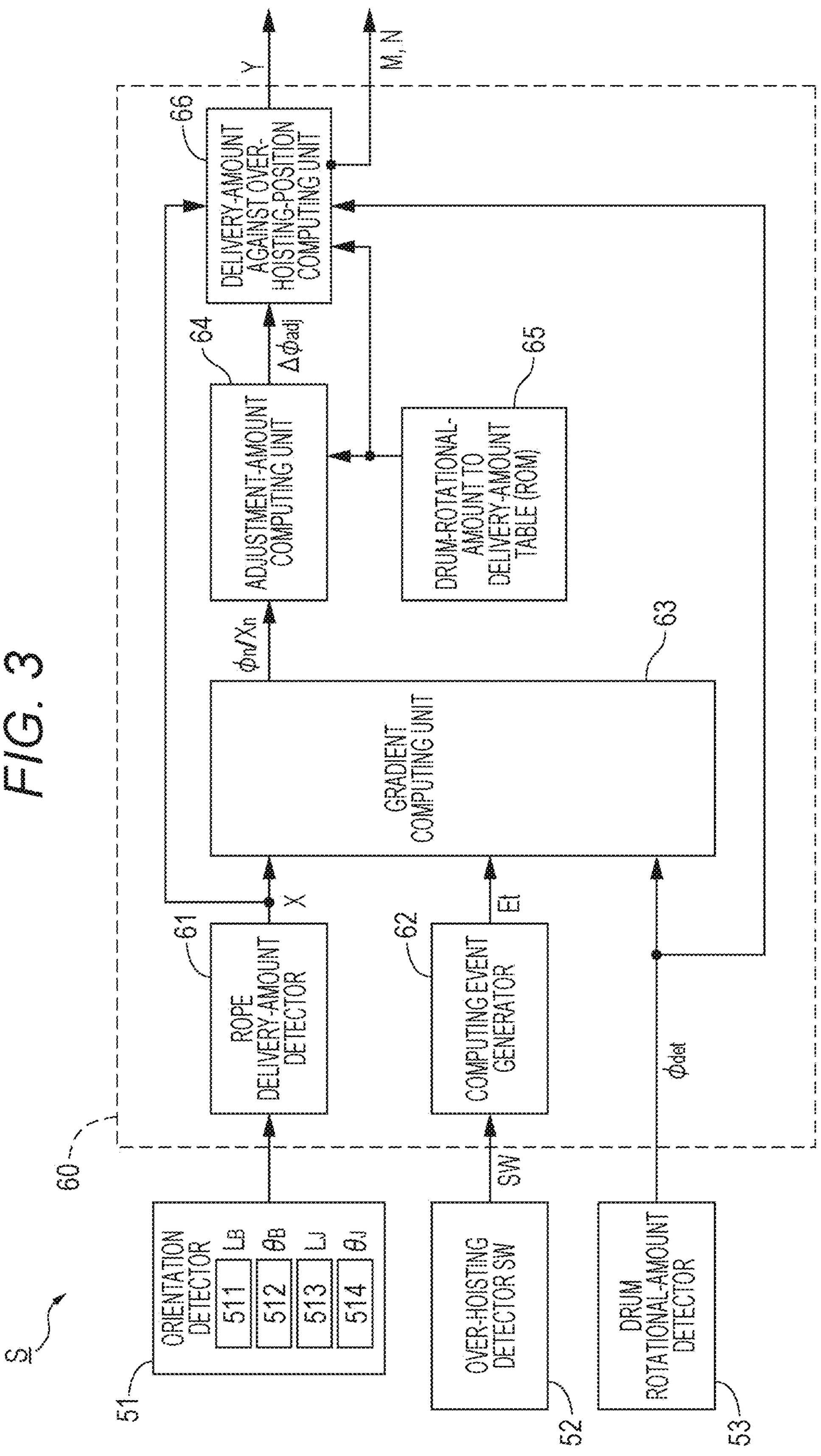
FIG. 3 is a block diagram of an estimation apparatus.

Next, the configuration of a control system of an estimation apparatus S mounted on the rough terrain crane 1 will be described with the block diagram of FIG. 3. As illustrated in FIG. 3, the estimation apparatus S according to the present embodiment includes mainly a controller 60 as a control unit. The controller 60 corresponds to a (micro-) computer including a CPU, a memory, a ROM, and an SSD. Then, the controller 60 as a control unit has, as input devices, an orientation detector 51, an over-hoisting position detector 52, and a drum rotational-amount detector 53 connected thereto.

The orientation detector 51 corresponds to an exemplary orientation detection unit and includes, for example, a boom-length detector 511, a boom derricking-angle detector 512, a jib-length detector 513, and a jib tilt-angle detector 514. Then, the boom length LB, boom derricking angle θB, jib length LJ, and jib tilt angle θJ detected by the orientation detector 51 are transmitted to the controller 60.

The controller 60 includes, as functional units, a rope delivery-length computing unit 61, a computing event generator 62, a gradient computing unit 63, an adjustment-amount computing unit 64, a drum-rotational-amount to delivery-length table 65, and a delivery-length against over-hoisting-position computing unit 66. The function of each functional unit will be specifically described with the flowchart of FIG. 4 to be described next.

(Control Flow)

Figure 4:
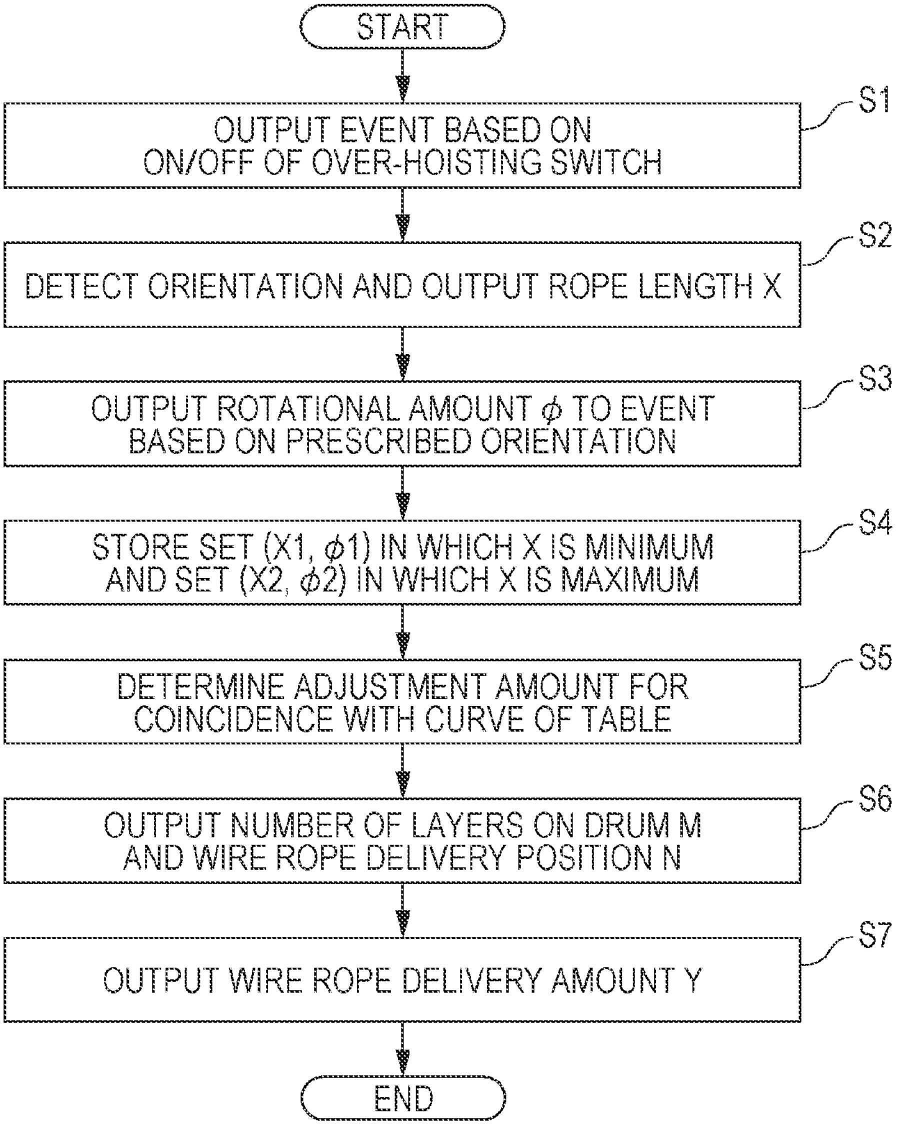
FIG. 4 is a flowchart of control with the estimation apparatus.

Next, a control flow of the estimation apparatus S will be described with the flowchart of FIG. 4.

First, the over-hoisting position detector 52 monitors the state of the over-hoisting detection switch, and the computing event generator 62 outputs a change in the switch (ON-OFF) as an event (Et) (step S1).

The orientation detector 51 detects the orientation (LB, θB, LJ, θJ) of the crane. Then, the rope delivery-length computing unit 61 finds, from the geometric relationship with the rope route based on the orientation detected values, the rope length (X) between the drum-side criterial position and the over-hoisting detection position (step S2). The rope delivery-length computing unit 61 corresponds to an exemplary calculation unit that calculates the delivery length of the wire rope (rope length (X)). Note that the rope length (X) may be retrieved from a table with the orientation detected values as indices.

The drum rotational-amount detector 53 corresponds to an exemplary detection unit and outputs a rotational amount φ of which the output value is 0 when the hook block 17 is located at the position of over-hoisting with a prescribed orientation (boom not extended at a derricking angle of 0) (step S3).

Next, the gradient computing unit 63 stores at least a set (X1, φ1) which the rope length (X) at the time of event occurrence has a minimum value and a set (X2, φ2) in which the rope length (X) at the time of event occurrence has a maximum value (step S4). Note that, although at least two points of the minimum and the maximum are stored, a plurality of points therebetween may be stored (FIG. 6(*a*)).

Figure 6:
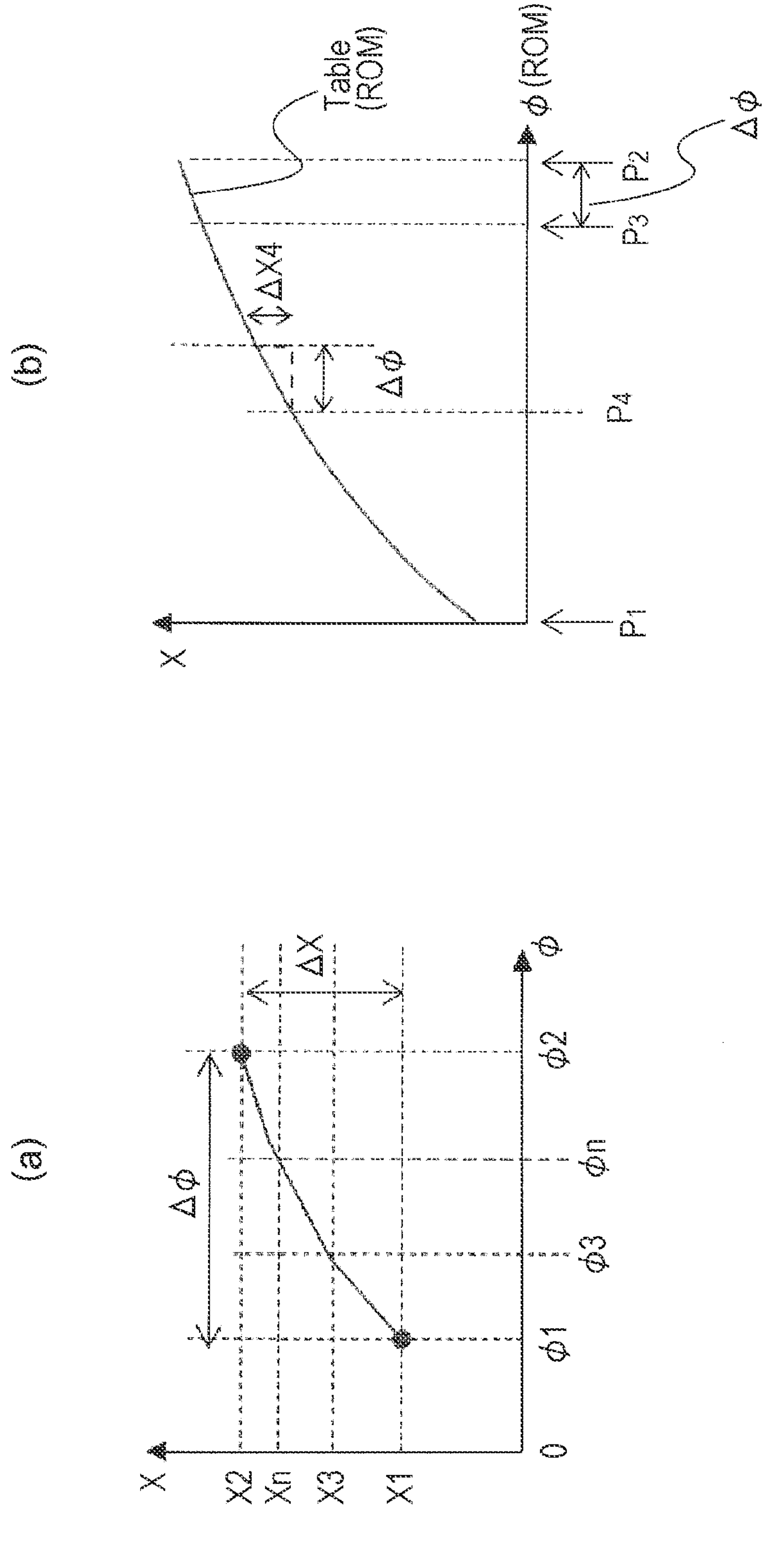
FIGS. 6(*a*) and 6(*b*) are explanatory graphs for search processing.

Next, the adjustment-amount computing unit 64 determines an adjustment amount (Δφadj) such that the stored points at the time of event occurrence coincide with the curve of the drum-rotational-amount to delivery-length table 65 (step S5, FIG. 6(*b*)). A procedure of finding an adjustment amount for two points of the maximum and the minimum by binary search will be described later.

Next, the delivery-length against over-hoisting-position computing unit 66 outputs, as the current number of layers on the drum (M), the number of layers on the drum at a rotational amount (φdet+Δφadj) resulting from adjustment of a drum rotational detected amount (φdet) by Δφadj (right vertical axis of FIG. 5) (step S6).

Simultaneously, the delivery-length against over-hoisting-position computing unit 66 determines the ratio at the same layer in the table determined as M (the ratio between the encoder width of a flat portion and the distance from the left edge portion to the current position at the same number of layers) as the rope delivery position (N) at the same layer (step S6).

In a case where the rope length between the drum-side criterial position and the over-hoisting detection position with the prescribed orientation (boom not extended at a derricking angle of 0) is defined as X0, the wire rope full length Y (wire rope delivery amount Y) with respect to the over-hoisting detection position can be expressed as follows (step S7).

$$Y=X_0-X(L_\theta, \theta_\theta, L_J, \theta_J)+Tb1(\phi_{det}+\Delta\phi_{adj})-Tb1(\Delta\phi_{adj})$$ [Mathematical Formula 1]

(Procedure of Finding Adjustment Amount by Binary Search)

Next, a specific procedure of calculation for fining an adjustment amount by binary search in the controller 60 of the estimation apparatus S will be described (step S5 in FIG. 4). A procedure of estimation will be described at power-on, in detection, and in use in order.

(At Power-On)

Figure 5:
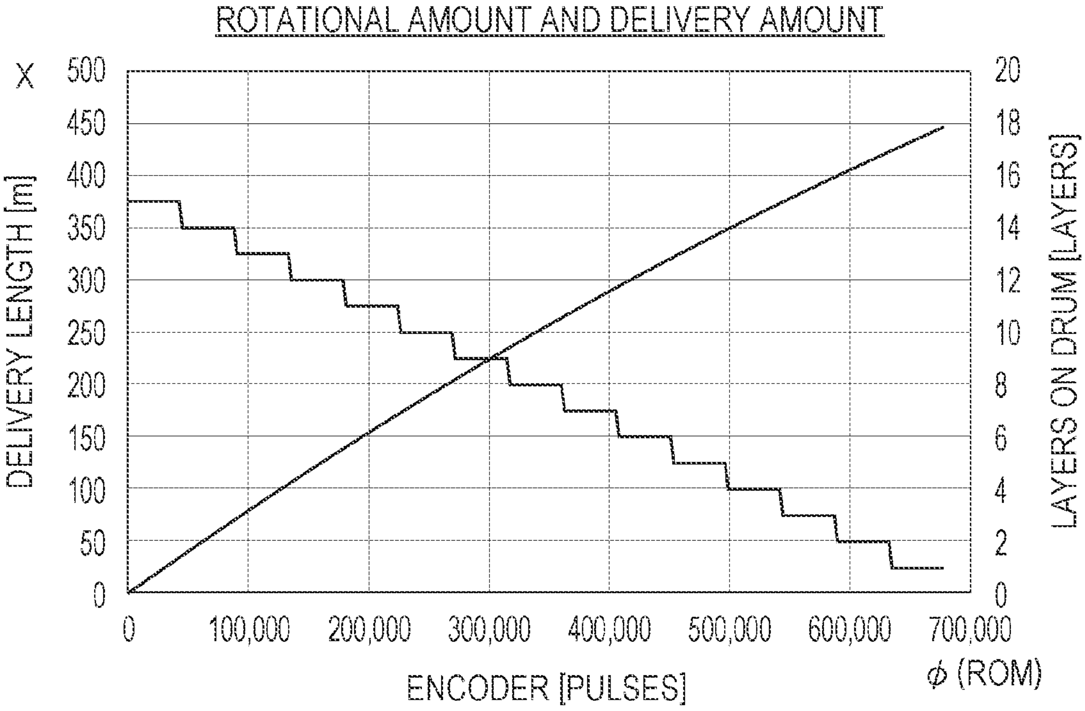
FIG. 5 is a graph indicating the relationship between rotational amount and delivery length.

(1) The relationship of the delivery length (left vertical axis) and the number of layers (right vertical axis) with drum rotation (horizontal axis) is stored as ROM data (refer to FIG. 5). In this case, the number of layers on the drum ranges to the maximum number of layers reelable physically. At the point in time maxim m reeling is conducted, the encoder value of drum rotation is 0.

(2) The drum rotational amount φ, of which the detected amount is 0 with the hook located at as over-hoisting, prevention weight included in the over-hoisting detection switch 145 and with the prescribed orientation (boom not extended at a derricking angle of 0), corresponds to the encoder value positive on the side of delivery.

(In Detection)

(3) A drum rotational amount φ1 and a rope delivery length X1 are recorded at the timing at which a change is made in a signal for detecting over-hoisting (over-hoisting/non-over-hoisting) with the rope length (X) that is minimum (first orientation). The rope delivery length X1 is calculated in accordance with the orientation of the working machine, such as the derricking angle, the boom length, or the position at which the over-hoisting weight is provided. In a case where multiple slinging is adopted, the number of lines is taken account of.

(4) A drum rotational amount φ2 and a rope delivery length X2 are recorded at the timing of detection of over-hoisting (over-hoisting/non-over-hoisting) with the rope length (X) that is maximum (second orientation).

(5) The difference in delivery length (ΔX=X2−X1) and the difference in rotational amount (Δφ=φ2−φ1) are calculated.

(6) A method of finding an adjustment amount by binary search will be now described with FIG. 6(*b*). As initial values for search, the minimum position (φ=0) of the rotational amount registered in the ROM and the maximum position (maximum value of φ) of the rotational amount registered in the ROM are P1 and P2, respectively. The position resulting from subtraction of the difference (Δφ) in rotational amount from the position P2 is P3.

(7) The intermediate point between P1 and P3 is P4. From the dram-rotational-amount to delivery-length table 65 in the ROM, an increase ΔX4 in delivery length responsive to an increase Δφ from the position P4 is calculated.

(8) ΔX4 and the difference (ΔX=X1−X2) in delivery length are compared.

a) In a case where the following condition is satisfied: ΔX4>ΔX, the value of P3 is updated with P4.

b) In a case where the following condition is satisfied: ΔX4<ΔX, the value of P1 is updated with P4, Until the following condition is satisfied: (ΔX4≈ΔX), a) and b) are repeated.

(9) φdet+Δφadj=φrom

The adjustment amount Δφadj is determined such that the above relationship is obtained, that is, the drum rotational detected amount φdet is equivalent to the rotational amount φrom in the drum-rotational-amount to delivery-length table 65 registered in the M.

(In Use)

(10)

For the rope absolute delivery length having taken account of the accurate number of layers, the wire rope full length Y (wire rope delivery amount Y) with respect to the over-hoisting detection position, the position N of the layer in use on the drum, and the ratio N of the rope delivery position in the layer in use are calculated.

Effects

Next, effects of the estimation apparatus S described in the embodiment will be described in sequence.

(1) As described above, the estimation apparatus S estimates the number of wound layers N of the wire rope 16 wound around the winch drum 41 of the mobile crane. The estimation apparatus S includes the orientation detector 51 that detects the orientation of the boom 14 of the mobile crane, the drum rotational-amount detector 53 that detects the rotational amount of the winch drum 41, and the controller 60 as a control unit that controls the boom 14 and the winch drum 41. The controller 60 stores the delivery length X1 of the wire rope 16 calculated based on the detected first orientation of the boom 14, the detected rotational amount φ1 of the winch drum 41, the delivery length X2 of the wire rope 16 calculated based on the detected second orientation of the boom 14, and the detected rotational amount φ2 of the winch drum 41, and estimates the number of wound layers M, based on the difference ΔX in delivery length and the difference Δφ in rotational amount between the first orientation and the second orientation. According to such a configuration, even in a case where the wire rope 16 is cut or an unprescribed length of wire rope 16 is used, based on the detected orientation of the boom 14 and the detected rotational amount φ of the winch drum 41, the number of wound layers M can be accurately estimated to find the full length Y accurately.

That is, according to the estimation apparatus S, the number of wound layers M can be accurately detected, so that the rope full length Y can be found accurately from the drum rotational amount φ. Furthermore, in a case where the original wire rope 16 is shortened by cutting, an abnormal operation in which all the wire rope 16 is delivered from the winch drum 41 or usage with the number of wound layers M not less than the expected number of wound layers that causes a winch torque shortage can be inhibited.

Then, the estimation apparatus S has an effect varying depending on the level of Δφ at the time of computing of the adjustment amount as follows:

1) Δφ larger than the rotational amount at the same layer

Since M and N can be calculated correctly, the full length Y can be found correctly based on the layer (M) in use and the rope delivery position (N).

2) Δφ smaller than the rotational amount at the same layer a) N=0(%)

The found delivery length is the upper limit of the actual delivery amount and thus can be used as the limit at the time of working range restriction on the side of reeling-out (as a safety that prevents contact with the target at the time of reeling-out operation).

b) N=100(%)

The found delivery length is the lower limit of the actual delivery amount and thus can be used as the limit at the time of working range restriction on the side of reeling-in (as a safety that prevents contact with the target at the time of reeling-in operation).

(2) In addition, preferably, the controller 60 as a control unit further includes the data recording unit ROM in which the relationship between the rotational amount φ of the winch drum 41 and the delivery length X of the wire rope 16 (drum-rotational-amount to delivery-length table 65) is recorded, and estimates, based on the recorded relationship between the rotational amount φ and the delivery length X and the difference Δφ in rotational amount and the difference ΔX in delivery length between the first orientation and the second orientation, the number of wound layers M at a coincidence in the rate of change (ΔX1/Δφ) therebetween. As above, from the relationship between the rotation amount φ and the delivery length X, having an upward convex curve, the number of wound layers M at a coincidence in the rate of change (gradient) ΔX/Δφ can be retrieved.

(3) Furthermore, preferably, the estimation apparatus S further includes the over-hoisting position detector 52 that detects the position of over-hoisting of the hook block 17, and the controller 60 as a control unit detects a state where the hook block 17 is at the position of over-hoisting as the first orientation or second orientation of the boom 14, and calculates the delivery length of the wire rope 16, based on the detected first orientation or second orientation of the boom 14. Prescription of the first orientation or second orientation with the over-hoisting position detector 52 as above enables accurate calculation of the delivery length X of the wire rope 16 in the first orientation or second orientation by geometric calculation.

(4) In addition, preferably, the controller 60 as a control unit selects, as the first orientation of the boom 14, a state of non-extension where the length of the boom 14 is minimum and a state of non-elevation where the derricking angle of the boom 14 is minimum. Such selection as above enables a larger difference Δφ in rotational amount and a larger difference ΔX in delivery length between the first orientation and the second orientation. Therefore, an improvement is made in the accuracy of estimating the number of wound layers M.

(5) Then, the rough terrain crane 1 serving as the mobile crane according to the present embodiment includes such an estimation apparatus S as described above, so that the full length Y can be accurately found with accurate estimation of the number of wound layers M. Thus, liftoff control or unloading control can be conducted accurately and safely.

The embodiment of the present invention has been described is detail above with reference to the drawings. However, the specific configurations in the embodiment are not limiting, and thus any changes in design without departing from the gist of the present invention are to be included in the present invention, For example, the winch 40 described in the embodiment may be a main winch or an auxiliary winch. For such a main winch, the relationship between the rotational amount φ and the delivery length X can be modified in accordance with the number of wire-rope lines of the wire rope 16.

In the embodiment, the case where the delivery lengths X1 and X2 of the wire rope 16 are found by geometric calculation based on orientation has been given, but this is not limiting. For example, the delivery lengths X1 and X2 of the wire rope 16 can be manually input after being measured in practice with a measuring tape.

Furthermore, in the embodiment, the number of wound layers M and the delivery position N are estimated such that the rate of change based on the minimum and maximum delivery lengths X coincides with the stored rate of change, but this is not limiting. For example, the number of wound layers M and the delivery position N can be estimated every time over-hoisting is detected, leading to an improvement in the accuracy of estimation with the estimated values (M, N).

INDUSTRIAL APPLICABILITY

The present invention can be applied to various cranes.

REFERENCE SIGNS LIST

1 Rough terrain crane
10 Vehicle body
11 Outrigger
12 Swivel
13 Bracket
14 Boom
141 Base boom
142 Intermediate boom
143 Front boom
144 Boom head
15 Derricking cylinder
16 Wire
17 Hook
18 Cab
19 Counter weight
20 Tension rod
30 Jib
40 Winch
51 Orientation detector
511 Boom-length detector
512 Boom derricking-angle detector
513 Jib-length detector
514 Jib tilt-angle detector
52 Over-hoisting position detector
53 Drum rotational-amount detector
60 Controller
61 Rope delivery-length computing unit
62 Computing event generator
63 Gradient computing unit
64 Adjustment-amount computing unit
65 Drum-rotational-amount to delivery-length table
66 Delivery-length against over-hoisting-position computing unit
S Estimation apparatus
X Rope length between drum-side criterial position and over-hoisting detection position.
Φ Drum rotational amount

The invention claimed is:

1. An estimation apparatus for estimating a number of wound layers of a wire rope, which is a number of layers of the wire rope wound around a winch drum, in a crane including a boom, the winch drum, and the wire rope wound around the winch drum, the estimation apparatus being mounted on the crane, the estimation apparatus comprising:

a calculation unit that calculates a delivery length of the wire rope, which is a total length of the wire rope that is unwound and fed-out from the winch drum;

a detection unit that detects a rotational amount of the winch drum; and a control unit that estimates the number of wound layers, based at least on a difference in the delivery length of the wire rope and a difference in the rotational amount of the winch drum between a first orientation and a second orientation of the boom, wherein the calculation unit, the detection unit, and the control unit are each implemented via at least one processor.

2. The estimation apparatus according to claim 1, wherein the control unit further includes a data recording unit in which a drum-rotational-amount to delivery-length table is recorded, the drum-rotational-amount to delivery-length table including the rotational amount of the winch drum and the delivery length of the wire rope in one-to-one correspondence, and estimates the number of wound layers, based on the drum-rotational-amount to delivery-length table, the difference in the delivery length of the wire rope, and the difference in the rotational amount of the winch drum, and the data recording unit includes a computer-readable medium.

3. The estimation apparatus according to claim 1, further comprising an over-hoisting position detector that detects a position of over-hoisting of a hook, wherein the first orientation and the second orientation of the boom are different from each other in terms of an orientation of the boom, and in each of the orientations, the hook fixed to the wire rope is at the position of over-hoisting.

4. The estimation apparatus according to claim 1, wherein the first orientation corresponds to a state of non-extension of the boom and a state of non-elevation of the boom.

5. A crane comprising the estimation apparatus according to claim 1.

* * * * *